United States Patent
Zou

(10) Patent No.: US 9,833,015 B2
(45) Date of Patent: Dec. 5, 2017

(54) SWEETENER WITH IMBEDDED HIGH POTENCY INGREDIENTS AND PROCESS AND APPARATUS FOR MAKING THE SWEETENER

(71) Applicant: NutraEx Food Inc., Burnaby (CA)

(72) Inventor: Li Li Zou, Burnaby (CA)

(73) Assignee: NutraEx Food Inc., Burnaby, British Columbia ( * ) Notice: Subject to any disclaimer, the term of this patent is extended or adjusted under 35 U.S.C. 154(b) by 84 days.

(21) Appl. No.: 14/497,865

(22) Filed: Sep. 26, 2014

(65) Prior Publication Data

US 2015/0359250 A1    Dec. 17, 2015

Related U.S. Application Data

(60) Provisional application No. 62/012,142, filed on Jun. 13, 2014.

(51) Int. Cl.
*A23L 1/30* (2006.01)
*A23L 27/30* (2016.01)
(Continued)

(52) U.S. Cl.
CPC ............. *A23L 27/33* (2016.08); *A23L 27/36* (2016.08); *A23L 27/37* (2016.08); *C13B 50/00* (2013.01); *A47J 43/04* (2013.01)

(58) Field of Classification Search
None
See application file for complete search history.

(56) References Cited

U.S. PATENT DOCUMENTS 3,619,294 A † 11/1971 Black
5,061,320 A † 10/1991 Goodacre
(Continued)

FOREIGN PATENT DOCUMENTS

WO    2014028243 A1 †  2/2014

OTHER PUBLICATIONS

Markosyan: Highly soluble stevia sweetener; WO 2012109506 A1; published Aug. 6, 2012.*

(Continued)

*Primary Examiner* — Patricia A George
(74) *Attorney, Agent, or Firm* — Nutter McClennen & Fish LLP

(57) ABSTRACT

An enhanced sweetener made from granules of a carrier, such as sucrose, embedded with molecules of a high potency sweetener, such as stevia extract. The process for making the enhanced sweetener involves dissolving the high potency sweetener in warmed water and mixing the resulting solution with the heated carrier. The resulting slurry is then dried, optionally under reduced pressure. The apparatus for producing the enhanced sweetener includes one or more heated agitators connected to a heated, airtight blender, which can be evacuated with a vacuum pump. The result is an enhanced sweetener with a homogenous distribution of high potency ingredients that retains the functionalities of sugar necessary for food preparation, improves the spreading of the sweetness throughout the food, and reduces aftertastes. Other high potency ingredients and carriers may also be used in the process.

24 Claims, 2 Drawing Sheets

(51) Int. Cl.
    *C13B 50/00* (2011.01)
    *A47J 43/04* (2006.01)

(56) References Cited

U.S. PATENT DOCUMENTS

| | | | | |
|---|---|---|---|---|
| 8,334,006 | B2 * | 12/2012 | Purkayastha | A21D 2/181 426/478 |
| 8,992,980 | B2 * | 3/2015 | Henke | A61K 9/0095 424/489 |
| 2005/0163903 | A1 * | 7/2005 | Honda | C12P 19/18 426/548 |
| 2005/0214425 | A1 † | 9/2005 | Vazirani | |
| 2006/0134292 | A1 * | 6/2006 | Abelyan | A23L 1/2366 426/548 |
| 2009/0148513 | A1 * | 6/2009 | Fraunhofer | C07K 16/241 424/451 |
| 2010/0015320 | A1 † | 1/2010 | King | |
| 2010/0189878 | A1 * | 7/2010 | Samburski | A61K 9/5078 427/2.14 |
| 2011/0236551 | A1 * | 9/2011 | Hammond | A23L 1/236 426/549 |
| 2012/0315366 | A1 * | 12/2012 | Zehnacker | C07H 15/04 426/548 |
| 2013/0164420 | A1 * | 6/2013 | Catani | A23L 1/2363 426/302 |
| 2013/0209658 | A1 * | 8/2013 | Spelman | A23L 1/2363 426/658 |
| 2016/0227826 | A1 | 8/2016 | Zou | |

OTHER PUBLICATIONS

Stevia.net: Conversion; published online at least by May 10, 2000 as verified by: http://web.archive.org/web/20000510234637/http://www.stevia.net/conversion.html.*

Cottis: How to make your own pur stevia and liquid stevia; published online at least by Apr. 13, 2012 as verified at: http://web.archive.org/web/20120413025839/http://wholelifestylenutrition.com/videos/how-to-make-your-own-pure-stevia-liquid-stevia-part-2.*

CSE: Chemistry StackExchange: Why does water evaporate spontaneously at room temperature; published online at least by Apr. 10, 2015 as verified at: http://web.archive.org/web/20150410203857/http://chemistry.stackexchange.com/questions/28399/why-does-water-evaporate-spontaneously-at-room-temperature-despite-dg-0.*

WikiHow: How to sweeten your coffee; published online by Jan. 25, 2003, as verified at: http://web.archive.org/web/20130125020424/http://www.wikihow.com/Sweeten-Your-Coffee.*

Pierson: Practical Druggist and Spatula, Consolidated, vol. 34; 1916.*

Fotos: WO 2000049036 A1, published Aug. 24, 2000.*

[NoAuthorListed] SK: Sneaky Kitchen: published on line at least by Nov. 28, 2010 as verified at: <http://web.archive.org/web/20101128225756/http://sneakykitchen.com/Glossary/sweetener-equivalents.htm.

\* cited by examiner
† cited by third party

SWEETENER WITH IMBEDDED HIGH POTENCY INGREDIENTS AND PROCESS AND APPARATUS FOR MAKING THE SWEETENER

This application claims the benefit of U.S. provisional patent application Ser. No. 62/012,142, filed on Jun. 6, 2014, which is incorporated by reference herein in its entirety.

TECHNICAL FIELD

The present invention generally relates to a granular, enhanced sweetener with imbedded, high potency ingredients. More specifically, it relates to sucrose imbedded with a high potency sweetener in a way that effectively increases the sweetness of the sugar without significantly compromising its chemical, physical and aesthetic properties that are important for its use as a food and drink ingredient.

BACKGROUND

Many people are using non-nutritive sweeteners as replacements for sugar in order to reduce their intake of calories. The replacement of sugar with a non-nutritive sweetener, however, removes the functionality of sugar that is essential for many recipes. In many applications, sugar provides additional functionality besides sweetness. For example, some of the functions of sugar include: interaction with molecules of protein or starch during the baking and cooking process; action as a tenderizer by absorbing water and inhibiting flour gluten development, as well as by delaying starch gelatinization; incorporation of air into shortening in the creaming process; caramelization under heat to provide cooked and baked foods with a pleasing flavor, color and aroma; acceleration of the growth of yeast by providing nourishment for it; a whipping aid to stabilize beaten egg foams; delaying the coagulation of egg proteins in custards; regulating the gelling of fruit jellies and preserves; helping to prevent spoilage of jellies and preserves; improving the appearance and tenderness of canned fruits; delaying discoloration of the surface of frozen fresh fruits; enabling a wide variety of candies through varying degrees of recrystallization; controlling the reformation of crystals through inversion (i.e. breakdown to fructose and glucose); and enhancing the smoothness and flavor of ice cream.

Further, the replacement of sugar with a non-nutritive sweetener and carrier requires expensive ingredients. For example, a common carrier for sugar replacement products is erythritol. However, this ingredient is many times more costly than sugar. Formulators cannot freely substitute erythritol for sugar, because it prices the resulting food product out of the competitive range.

Another drawback with high potency sweeteners is that they are often not dispersed evenly. When highly concentrated sweeteners are incorporated into a food recipe, it is difficult to mix them thoroughly and evenly. Blends of ingredients including high potency sweeteners can have clumps of high potency sweetener in the mix, which taste strong and bitter.

If sugar is replaced with another sweetener, the ingredient list on food products must be amended to remove sugar and add the sweetener, in order to reflect the ingredients in the sweetener.

Workplace safety and unacceptable production losses due to dust are also issues. In particular, when utilizing high potency sweeteners in a powdered form, there is the problem with escaping dust coating the machinery and getting into operators' throats, causing irritation and potential workplace safety issues. The loss of powdered sweetener in the form of dust can be costly, since it is so expensive. Typically, such powdered sweeteners are the most expensive ingredients and can cost hundreds of dollars per kilogram.

SUMMARY OF INVENTION

The apparatus and manufacturing process disclosed herein make a concentrated, sugar-like sweetener that is typically 2-10 times sweeter than sugar. Small amounts of high potency sweeteners and optionally other ingredients are imbedded (or micro-encapsulated) in sugar as the carrier. Recipes that traditionally require sugar can be made using less sugar if the resulting, enhanced sweetener disclosed herein is used instead. The invention improves the taste of the enhanced sweetener by removing the bitterness that can be caused by high potency ingredients, which is achieved by thoroughly dispersing the high potency ingredients.

Disclosed herein is a granule of enhanced sweetener comprising an edible carrier imbedded with molecules of a high potency sweetener. Also disclosed is an enhanced sweetener comprising a plurality of granules of enhanced sweetener, each granule comprising an edible carrier imbedded with molecules of a high potency sweetener, wherein the high potency sweetener is distributed homogenously between the plurality of granules.

Further disclosed are granules of enhanced sweetener made by: dissolving the high potency sweetener in warmed water to form a solution; heating the carrier; mixing the solution with the heated carrier to form a slurry; and drying the slurry. The slurry is optionally dried under reduced pressure.

Still further disclosed is a process for making an enhanced sweetener, comprising: dissolving a high potency sweetener in warmed water to form a solution; mixing the solution with granules of a heated, edible carrier to form a slurry; and drying the slurry. The slurry is optionally dried under reduced pressure. Also disclosed is a process, wherein the warmed water is at a first temperature, the process further comprising: dissolving one or more of a vitamin, a mineral, a flavoring, a coloring and a further high potency sweetener in warmed water at a second temperature to form a further solution; and mixing the further solution with the solution and heated granules.

Yet further disclosed is an apparatus for producing an enhanced sweetener comprising: a heated agitator with a mixing element for dissolving a high potency sweetener in warmed water to form a solution; a heated blender for heating granular sucrose; a pipe connecting the heated agitator and the blender, said pipe for passing the solution from the agitator to the blender; a mixing element in the blender for mixing the sucrose and the solution; a vacuum pump in fluid communication with the blender, for reducing pressure in the blender; airtight seals on the blender for maintaining a reduced pressure in the blender; and a moisture sensor for measuring moisture content inside the blender.

BRIEF DESCRIPTION OF THE DRAWINGS

The following drawings illustrate embodiments of the invention, which should not be construed as restricting the scope of the invention in any way.

DETAILED DESCRIPTION

A. Glossary

Carrier—As used here, a carrier is an edible substance that is capable of holding, supporting or otherwise bearing one or more edible, high potency ingredients within it. The edible carrier may be sweet or non-sweet. Herein, an example of a carrier is sucrose.

Granule—A small particle or grain having the form of a single crystal, multiple crystals stuck together or an agglomeration of smaller, constituent particles that are not readily separable.

High potency ingredient—An ingredient that only needs to be minimally present in a food product in order to have a significant effect on it. Examples of high potency ingredients include high potency sweeteners, vitamins, minerals, food coloring and flavoring. They may be natural or artificial.

High potency sweetener—A high potency ingredient that is many times sweeter than sugar. Such high potency sweeteners may be 50-400 times sweeter than sugar. Examples include stevia extract, monk fruit (Luo Han) extract, sucralose, etc. High potency sweeteners are chemically different from sugars and are not classified as sugars. They may be natural or artificial.

Sugar—This is used to refer to table sugar or sucrose, which is the sugar most commonly used as a food ingredient. Other sugars include maltose, lactose and other disaccharides, as well as monosaccharides such as glucose or dextrose, fructose, and galactose. Such other sugars may also be used as the edible carriers referred to herein.

B. Overview

Figure 1:
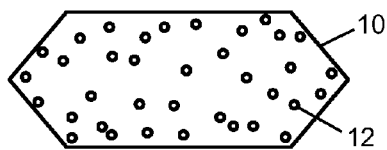
FIG. 1 is a cross-sectional schematic representation of a granule of sugar imbedded with high-potency sweetener.

Referring to FIG. 1, a granule of the enhanced sweetener according to an embodiment of the present invention is shown. In this example, a granule of sugar 10 is imbedded with molecules of high-potency sweetener 12, such as stevia extract. The high potency sweetener 12 is inside the granule 10, and is distributed throughout its volume. The distribution within the granule is a result of the high potency sweetener being absorbed into the granule. The homogeneity of the distribution will depend on the particular conditions of the process used to make such granules, and may well be less concentrated at the center of the granule than near its periphery. From granule to granule within the resulting, enhanced sweetener, the distribution of high potency ingredients can be considered to be homogenous. The uniformity of the enhanced sweetener can therefore be considered to be similar to the uniformity of regular table sugar. As a consequence, it follows that the high potency ingredient will be well-dispersed throughout any final food product in which the enhanced sweetener is an ingredient.

Instead of, or as well as stevia extract, other high potency ingredients may be absorbed into the granule of sugar 10. For example, other high potency sweeteners such as monk fruit extract may be used. Furthermore, other high potency ingredients may be included besides a high potency sweetener or sweeteners, such as one or more vitamins, minerals, food coloring and/or food flavoring. Also, other carriers may be used instead of sugar.

Figure 2:
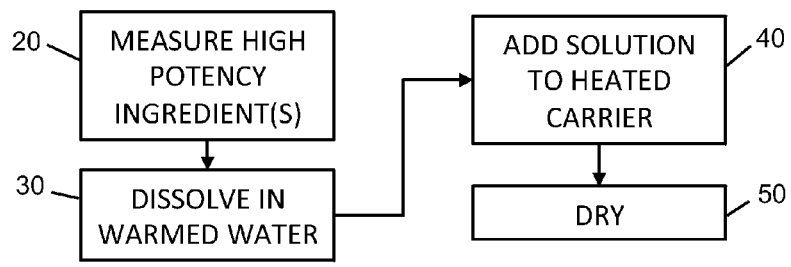
FIG. 2 is a flowchart of the main steps of a process for making an enhanced sweetener according to an embodiment of the invention.

FIG. 2 is a flowchart of the main steps of a process for making an enhanced sweetener according to an embodiment of the invention. In step 20, an amount of one or more high potency ingredients, such as stevia extract, is accurately measured. The high potency ingredients are then dissolved in warmed water, in step 30. The resulting solution is then added, in step 40, to a carrier, such as sucrose, which has been heated. The mixture of solution and carrier, or slurry, is dried, in step 50, to yield granules of carrier imbedded with molecules of high potency ingredients.

C. Detailed Process

Figure 3:
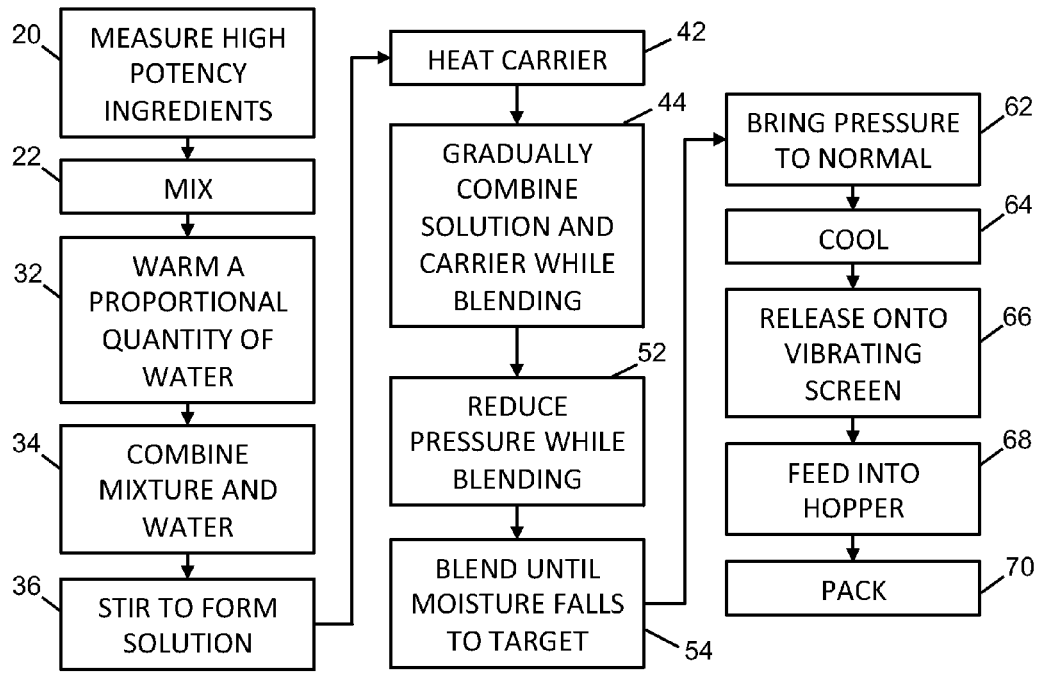
FIG. 3 is a flowchart showing more detailed steps of a process for making an enhanced sweetener according to an embodiment of the invention.

Referring now to FIG. 3, more detailed steps of a process for making an enhanced sweetener according to an embodiment of the invention are shown in a flowchart. In step 20, amounts of one or more high potency ingredients, such as stevia extract, other high potency sweeteners, natural or artificial flavors, natural or artificial colors, gums, stabilizers, or nutrients such as vitamins and minerals, are accurately measured. These high potency ingredients are weighed according to the degree to which the resulting sweetener is to be enhanced. For example, it may be desired to make an enhanced sweetener that is twice as sweet as regular table sugar. For the same amount of sweetness, the calorific content provided by the enhanced sweetener will be 50% less than that of sugar. The amount of stevia extract, for example, which is required, should have a total sweetness equal to the quantity of sugar used in order to effectively double the sweetness of the sugar. The actual amount will also depend on the sweetness of the variety of stevia extract used. The sweetness of stevia varies widely due to the concentration of active components known as steviol glycosides and rebaudiosides. As such, the amount of stevia used should be calculated carefully, in advance, for each batch. As another example, it may be desired to make an enhanced sweetener that is ten times as sweet as sugar, in which the calorific content is reduced by 90%. In this case, the total sweetness of the stevia extract should be nine times that of the amount of sugar used. Likewise, different color shades, different nutrient contents and different flavoring strengths may be desired in the enhanced sweetener. The weights of the high potency ingredients must therefore be measured in relation to the amount of carrier that is to be used.

The weighed high potency ingredients are then mixed together, in step 22. They may be mixed in any suitable mixing device, for example. Even if there is only one ingredient, it may be stirred in a mixer in order to remove clumps that may be present in it.

In step 32, a proportional amount of purified water is heated separately from the high potency ingredients to a temperature between about 25° C. and about 75° C. The amount of water is between roughly one and ten times the amount of high potency ingredients. The water may be heated in an agitator tank, for example. The temperature of the water will depend on the particular high potency ingredients. Lower temperature can work better for some ingredients, whereas other ingredients may require higher temperatures in order to achieve a suitable solubility. Some ingredients, such as stabilizers and thickeners, may need the higher temperatures to dissolve completely. Some ingredients cannot tolerate high temperatures, e.g. vitamins, and these may need to be processes at lower temperatures overall in order to retain their effectiveness. The solution begins to dry as soon as it comes into contact with the carrier, and we have found that at about 80° C., for example, the solution can be adsorbed before reaching too high a temperature. However, it has been found that if the solution is above 80° C. when it is added to the carrier, it may begin to dissolve the carrier too rapidly, if sucrose, preventing the imbedding of the high potency ingredients from taking place. As lower temperatures are favorable in terms of energy consumption, and higher temperatures make for smoother operation, it has been found that about 60° C. is an optimum temperature for the enhancement of sucrose with the stevia or monk fruit extracts that have been tested. Note, however, that the optimum temperature may be dependent on the carrier and starting ingredients as well as the particular apparatus used for the process.

Instead of water, other solvents that may be used include ethanol and vegetable oil, for dissolving ingredients that are not water soluble.

In step 34, the prepared mixture of high potency ingredients are combined with the heated water. Depending on the amounts of each, the ingredients to water ratio is between about 1:1 and 1:10. Ingredients such as gums, for example, may require more water. If there is too much water, the imbedding process may be compromised by destroying some or all of the semi-transparency of the sugar granules or by reducing the granule size. There may also be loss of efficacy and increased energy consumption. If there is too little water, the solution of high potency ingredients will be too thick or concentrated, which will make it more difficult to disperse throughout the whole carrier, and absorption of the high potency ingredients into the granules will be uneven. The amount of water, as well as being related to the amount of high potency ingredients, should therefore be chosen in relation to the amount of carrier to which it is to be added.

In step 36, the combined mixture of warmed water and high potency ingredients is stirred well, for example in an agitator, until the ingredients are completely dissolved. In some cases the resulting solution will be transparent, but this will not necessarily be the case for all mixtures.

In step 42, which may be done in parallel to the preceding steps, the carrier is heated. This may be done in a blender, for example, in which one or more following steps can be carried out. The carrier, in this case sucrose, is heated to between about 95° C. and about 100° C. Temperatures below these will cause the process of absorption to be slow, and temperatures above these may cause the sucrose to burn or cake.

In step 44, the water based solution resulting from step 36 is gradually released onto the carrier, while blending, to form a slurry. As an example, the rate at which the solution is released may be 1 liter/minute on average. This rate, however, can vary widely based on the viscosity of the ingredients, the speed of the blending and the amount of carrier. If the solution is released onto the carrier too fast, then the imbedding process may be compromised by the reduction of the semi-transparency of the sugar granules or by a reduction in the granule size. If the solution is released onto the carrier too slowly, then it will be more difficult to disperse it throughout the whole carrier, and absorption of the high potency ingredients into the granules will be uneven. The speed of blending is low enough to avoid shear forces, which may cause granule breakage. Depending on the size of the blender and the mixing blades in it, the speed of rotation may, for example, be around one revolution per minute. The solution may be added to the carrier continuously, in a stream, or in batches every so often. Blending continues while all the solution is being added, and possibly afterwards as well, in order to distribute the solution everywhere throughout the carrier and wet all the granules. The blending and drying times are longer when higher concentrations of enhanced sweetener are produced.

In step 52, the slurry is subjected to a reduced pressure while the blending continues. For example, the pressure may be reduced to 90 kPa below atmospheric pressure, or to about a tenth of atmospheric pressure. The reduced pressure speeds up the evaporation of the water from the solution that is wetting the carrier, contributing to the drying of the slurry. By shortening the time to dry the slurry, energy is saved and negative effects on the granules are reduced. Such negative effects may include damage due to excessive stirring. Further, absence of the vacuum may promote destruction of temperature sensitive ingredients or reduce their effectiveness and stability.

In step 54, blending of the slurry continues at reduced pressure until its moisture content reaches a predetermined target. Such a target may be a moisture content of 0.15% or below, for example. As the high potency ingredients in the solution are gradually absorbed into the carrier granules, and as the water from the slurry evaporates and is carried away, the carrier gradually dries out. At this stage, any granules that may have clumped together fall apart, and the granules, now of enhanced sweetener, are free flowing granules. While other moisture levels may be acceptable, a moisture content of 0.15% or below is suitable for safe storage and transport.

In step 62, after the moisture level of the enhanced sweetener has reached the target, the pressure is brought back up to atmospheric pressure. The enhanced sweetener is cooled, while still in the blender, in step 64. These latter two steps may be switched or overlap. Blending may continue during cooling.

When the enhanced sweetener has sufficiently cooled, it is released in step 66 onto a vibrating screen. The purpose of the vibrating screen is to ensure that the particle size of the enhanced sweetener is within a desired specification, by removing particles that are either too large or too small. Out of spec particles may be recycled. The particles of desired size are then fed into a hopper, in step 68. In step 70, the granules of enhanced sweetener are released from the hopper into packs.

Figure 4:
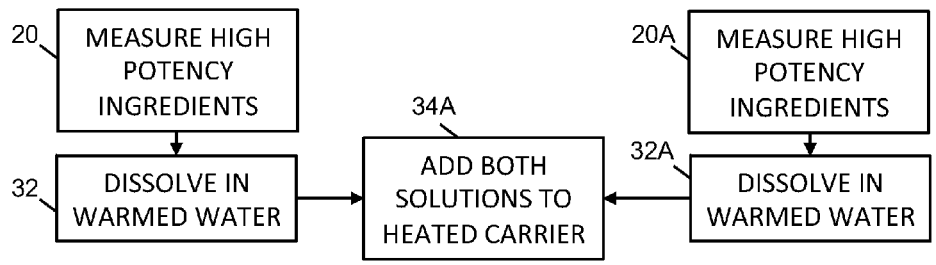
FIG. 4 is a flowchart of an alternate process in which high potency ingredients are combined.

Referring to FIG. 4, some steps of an alternate process for making an enhanced sweetener in which high potency ingredients are combined are shown. If there are two sets of high potency ingredients, where each set has a different optimum temperature for dissolving in water, then the two sets of high potency ingredients are measured separately in steps 20 and 20A. In steps 30 and 30A, each set of measured high potency ingredients is added to and dissolved in water held at a different temperature. In step 34A, both of the different temperature solutions resulting from steps 30 and 30A are added to the heated carrier, either simultaneously or sequentially.

D. Apparatus

Figure 5:
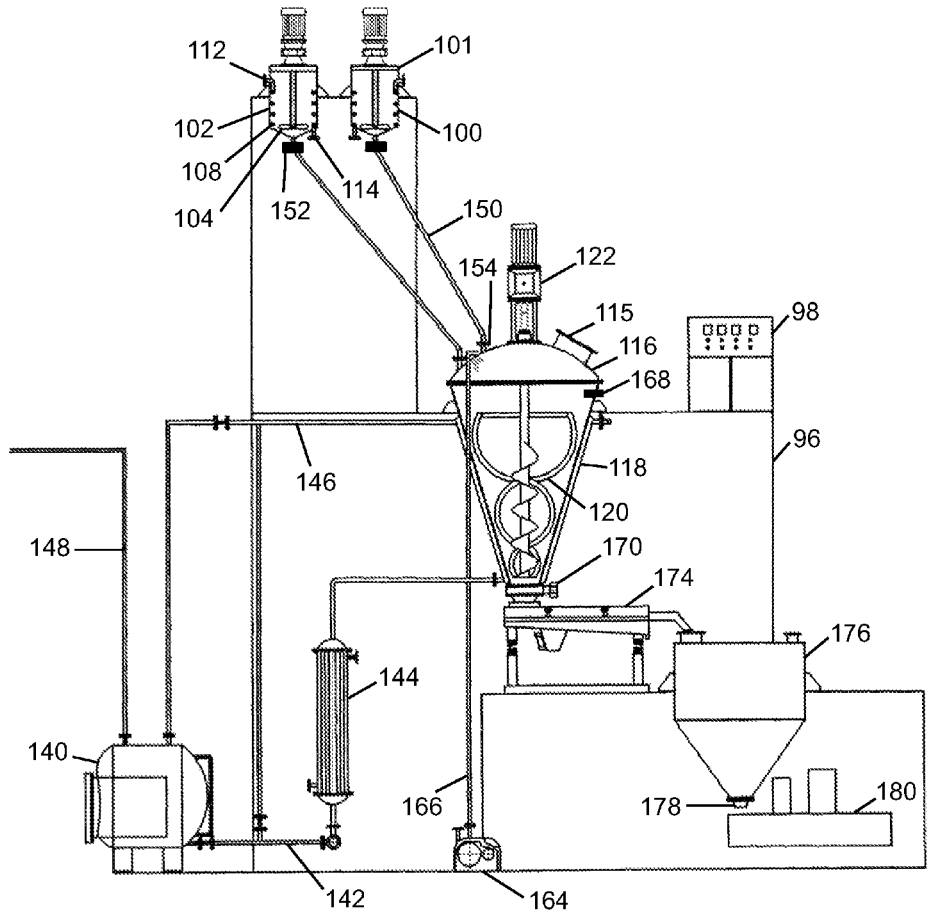
FIG. 5 is a schematic representation of an apparatus for producing an enhanced sweetener according to an embodiment of the invention.

In FIG. 5, an exemplary apparatus for producing an enhanced sweetener with specialized equipment is shown which can be used in carrying out the above-described process of the invention. Some or all components of the apparatus are mounted on a workstation 96 and controlled by a switch control panel 98 or computer. Time, temperature and moisture parameters are controlled by the control panel 98, but they may also be controlled manually.

Water is heated in an agitator tank 100. When the water is at the desired temperature, the measured high potency ingredients, pre-mixed if necessary, are introduced into the agitator tank 100. Water for making the solution of high potency ingredients, and the high potency ingredients themselves, can be introduced into the agitators through a port or other temporary opening at the top 101. If there are different high potency ingredients, then some can be put into another agitator tank 102, also containing heated water. In particular, if different sets of high potency ingredients require different temperatures of water for optimally dissolving them, then each set can be put into its own agitator tank. Each agitator tank 100, 102 has an agitator 104 that rotates, a series of heating and/or cooling pipes 108 wound around or inside it, and a fluid inlet 112 and fluid outlet 114 in communication with the pipes 108. The heating and/or cooling fluid pumped through the pipes 108 may be steam, water or oil, for example. The temperature of the contents of the agitator tanks 102, 104 should be able to be raised to and maintained at a temperature in a range of about 25° C. to about 75° C. The agitators 104 stir the contents of the agitator tanks 100, 102 until the high potency ingredients are completely dissolved. The agitator tanks may be operated simultaneously or sequentially. The agitator tanks 102, 104 are designed to mix different types of solution prior to its injection into the carrier, and as such may also mix ethanol or vegetable oil based solutions.

While the high potency ingredients are being dissolved, the carrier, for example, sucrose, is introduced via port 115 into a blender 116 with a temperature control jacket 118, and heated. Optionally, the carrier may be stirred with a counter rotating set of blades 120, rotating about a vertical axis, while it is being heated, in order to distribute the heat more rapidly. The rotational rate of the blender blades 120 is controlled by an agitator reduction box 122.

The temperature of the contents of the blender 116 should be able to be raised to and maintained at a temperature in a range of about 95° C. to about 100° C., and then to be cooled to room temperature. The enhanced sweetener is stable at room temperature. The temperature of the blender 116 is controlled by an oil heater 140, connected by an oil inlet pipe 142 to a condenser 144, which in turn is connected to the temperature control jacket 118. An oil return line 146 feeds back oil from the temperature control jacket 118 to the oil heater 140. An exhaust pipe 148 leads waste gases away from the apparatus.

When the solution(s) of high potency ingredients and the carrier are at the desired temperature(s), the solution(s) are fed from the agitator tanks 100, 102 through feed pipes 150 into the blender 116. Valves 152 and/or 154 on the feed pipes, which are in fluid communication with the agitator tanks and blender, are used to control the flow of solution from the agitator tanks 100,102 to the blender 116. The valves 152, 154 should be such as to allow a gradual flow of the solution into the blender 116, at such a rate as to prevent localized or global over wetting of the carrier and premature drying of localized solution/carrier mixture. The blender blades 120 rotate as the solution is being added to the carrier, and ideally the speed of rotation should be matched with the rate at which solution is fed into the blender. The temperature control jacket 118 continues to maintain the temperature of the carrier during mixing of the solution with the carrier.

After the solution has all been added to the carrier, the valves 154 are closed, and, if not already done so, the port 115 is closed, in order to make the blender 116 airtight. Besides these, there may be other airtight seals on the blender that help it to maintain a pressure below atmospheric. A vacuum pump 164, connected in fluid communication to the blender 116 via a vacuum line 166, is switched on in order to reduce the pressure inside the blender. As the pressure is being reduced, and after it has been reduced, the blender blades 120 continue to rotate. The vacuum pump is capable of maintaining a pressure of at least 90 kPa below atmospheric. A moisture sensor 168 detects the moisture level present inside the blender 116. When the moisture sensor 168 detects that the moisture inside the blender has dropped to its target level, the vacuum pump 164 can be stopped, the contents of the blender 116 cooled using the condenser 144, and the blending blades 120 stopped. The moisture sensor 168 may include a gauge that is visible on the outside of the blender 116, and/or an electronic output from the moisture sensor may be connected to the switching control box 98.

A vomit pipe 170 at the bottom of the blender 116 can then be opened to release the contents of the blender onto a vibrating screen 174. As the contents of the blender pass through the vibrating screen 174, unwanted portions, such as clumps, of it are separated from it, and the desired portions are fed through it into a hopper 176. The clumps, if any, may be broken up by the vibrations of the screen so that they eventually pass through it with the rest of the product. The outlet of the hopper 178 is positioned over a packing machine 180 that is used to pack the resulting, enhanced sweetener into boxes or other containers.

E. Variations

The process may use only natural high potency ingredients, or a mixture of natural and artificial high potency ingredients. Particularly, since natural high potency ingredients typically contain a much greater spread in molecular composition than artificial high potency ingredients, the invention provides a very suitable way of spreading the mixed flavors in natural high potency sweeteners, especially any flavors related to bitterness. The process also makes it easier to handle the widely varying sweetnesses of natural high potency sweeteners, which may vary from 50-400 times the sweetness of sugar for the nominally the same high potency sweetener. This is not as much a problem for artificial sweeteners, which generally have a much narrower chemical composition range.

The process of making the sweetener may result in traces of the high potency ingredients remaining on the surfaces of the granules of carrier, due to the probabilistic nature with which the process of absorption progresses. This may or may not be an issue, depending on the amount of the traces and the intended purpose of the resulting sweetener. The more of the high potency ingredients that are left on the surfaces of the granules, the more cloudy the granules will appear. An example of this being an acceptable state is when the enhanced sweetener is to be further processed to form a fine powder similar to icing sugar. Another example is when the enhanced sweetener is to be mixed with opaque ingredients such as chocolate in a subsequent step.

While distilled water is currently the preferred type of water that should be used, it is conceivable that other types of water may be used.

The apparatus and corresponding process may be partially or fully automated. For example, an operator may manually control the feed of the solution into the blender, such that it is added in portions. The blender may then be operated for 10-15 minutes, under vacuum, after which the operator brings it up to pressure, opens it up and checks for clumps. The actual process time will depend on the desired concentration of the enhanced sweetener, with higher concentrations needing more time than lower concentrations. If clumps are present, the blender is closed and operated for longer. If there are no clumps, then another portion of the solution is added and the process is repeated. When all the solution has been added, and all the clumps appear to have disappeared, the contents of the blender can be cooled and released via the vibrating screen into the hopper.

An alternate example of a blender would be a rotating barrel dryer with a gas fired heater. The barrel dryer rotates on a horizontal axis and has internal baffles which cause the contents to mix as the barrel turns. The ends of the barrel are sealed after the contents are poured in. After this, the air is pumped out and the dryer turns, mixing the contents while the heater maintains a constant elevated temperature.

Different components of the apparatus, other than those shown, may be used. Components may be duplicated and may be proportioned or shaped differently to those shown. As an example, three or more agitator tanks may be used. The rotating blades in the blender may rotate about a non-vertical axis, and there may be more than one set of blades on different axes. The blender may have off-axis mixing blades. The main purpose of the blades is to mix the carrier with the solution evenly and thoroughly, without damaging the carrier, so any configuration of mixing element(s) that achieve this is possible.

Water may be used in the temperature control jacket 118, instead of oil, but additional care should be taken near the boiling temperature of the water to prevent its boiling and a dangerous pressure build up.

Outside the specified temperature ranges the process may still work, but the result may not be optimum.

F. Conclusion

It is the combination of blending, an elevated temperature and reduced pressure that allows the imbedding of the high potency ingredients in the carrier to take place. Examples of food products that can be made with the enhanced sweetener include chocolate milk, yogurt, donuts, cakes etc.

An advantage of the disclosed invention is that it allows some sugar to be retained in food products that are made with the enhanced sweetener, which in turn maintains the functionalities of the sugar in the ingredients. The invention also allows for the reduction of sugar in food products at an affordable cost, since sugar as a carrier is less expensive than many other carriers. As a result of affordably reduced sugar in food products, more people can enjoy a healthy diet.

Another advantage of the invention stems from the incorporation of the high potency sweetener with sugar, with the result that the enhanced sweetener is much easier to mix well in food production than high potency sweeteners are alone. This is because the process ensures that the carrier contains evenly distributed high potency sweetener. Benefits of even distribution of the high potency ingredients include reduced bitterness and reduced aftertaste.

The invention necessitates only a simple change to the ingredients list on existing food packages. Since sugar may already be in the ingredients, it does not need to be listed again. The lower quantity of sugar may change the sequence of ingredients, moving sugar down below other components. Many products already contain natural flavor, so the label need only change to show natural flavors (plural). The only addition to the label is the high potency sweetener that is added.

Also, by dissolving the high potency ingredients in water, the invention eliminates the dust in food production, thereby eliminating the related workplace hazard and reducing production losses.

The foregoing has been a detailed description of illustrative embodiments of the invention. The subject matter of the present invention has been described with specificity to present exemplary embodiments. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" in relation to flowcharts may be used herein to connote different elements of methods employed, the term should not be interpreted as implying any particular order among or between various steps herein disclosed unless and except when the order of individual steps is explicitly described.

Various modifications and additions can be made without departing from the scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

The invention claimed is:

1. A process for making an enhanced sweetener, comprising:
    measuring an amount of a high potency sweetener;
    measuring an amount of solvent to dissolve the amount of the high potency sweetener;
    dissolving the measured amount of the high potency sweetener in the measured amount of the solvent at a temperature of between 25° C. and 75° C. to form a solution;
    heating an edible carrier to between 95° C. and 100° C., wherein the edible carrier is sucrose;
    releasing the solution onto dry particles of the edible carrier when the edible carrier is at a temperature between 95° C. and 100° C. to wet the dry particles and form a slurry such that the solution begins to dry upon contacting the edible carrier; and
    drying the slurry.

2. The process of claim 1, wherein the slurry is dried under reduced pressure.

3. The process of claim 2, wherein the reduced pressure is 90 kPa below atmospheric pressure.

4. The process of claim 1, wherein the high potency sweetener is *stevia* extract.

5. The process of claim 4, wherein the solvent is at a temperature of 60° C.

6. The process of claim 1, further comprising dissolving one or more of a vitamin, a mineral, a flavoring and a coloring in the solution.

7. The process of claim 1, wherein the solvent is at a first temperature, the process further comprising:

dissolving one or more of a vitamin, a mineral, a flavoring, a coloring and a further high potency sweetener in a second solvent at a second temperature to form a second solution; and releasing the second solution onto the first solution and the dry particles.

8. The process of claim 1, wherein the high potency sweetener is one or both of monk fruit extract and sucralose.

9. The process of claim 1, further comprising passing the dried slurry through a vibrating screen.

10. The process of claim 1, wherein the high potency sweetener and the solvent are in amounts having a respective ratio of between 1:1 and 1:10.

11. The process of claim 1, wherein releasing the solution onto the particles further comprises blending the solution and the particles.

12. The process of claim 1, wherein the slurry is blended while being dried.

13. The process of claim 1, wherein the slurry is blended under a pressure that is less than atmospheric pressure, while being dried until a moisture content of the slurry falls to 0.15% or below.

14. The process of claim 1, wherein the solvent is at a first temperature, the process further comprising:

dissolving a second high potency ingredient in a second solvent at a second temperature to form a second solution; and releasing the second solution with the first solution onto the dry particles.

15. The process of claim 1, wherein the solvent is ethanol or vegetable oil.

16. The process of claim 1, wherein the solvent is water.

17. The process of claim 1, wherein the solution is at a first temperature and the edible carrier is at a second temperature when the solution is released onto the particles, the first temperature being lower than the second temperature.

18. The process of claim 1, wherein releasing the solution onto particles of an edible carrier further comprises blending while releasing the solution onto particles of the edible carrier.

19. The process of claim 1, wherein the solution becomes imbedded in the edible carrier as the solution dries.

20. The process of claim 1, wherein the measuring, dissolving, releasing, and drying steps do not involve agglomeration.

21. The process of claim 1, wherein dry particles of the edible carrier are in a blender, wherein the blender is optionally a rotating barrel dryer, when the solution is released onto the dry particles.

22. The process of claim 21, further comprising operating a vacuum pump in fluid communication with the blender to apply reduced pressure thereto.

23. The process of claim 22, wherein the reduced pressure is created by closing one or more valves of the blender.

24. The process of claim 23, wherein the blender is airtight after the valves are closed.

* * * * *